Patented Oct. 27, 1942

2,300,159

UNITED STATES PATENT OFFICE 2,300,159

MANUFACTURE OF 1,2,3-TRICHLORO-PROPANE

Kenneth C. Laughlin and Cecil L. Brown, Baton Rouge, La., assignors to Standard Oil Development Company, a corporation of Delaware No Drawing. Application March 4, 1939,
Serial No. 259,930

4 Claims. (Cl. 260—662)

This invention relates to an improved process for preparing trichloropropanes and more particularly to the preparation of 1,2,3-trichloropropane from propylene.

Although 1,2,3-trichloropropane is desirable for the production of glycerine, previous attempts to prepare it directly by chlorination of propylene have not been successful. Instead, it has been considered necessary first to chlorinate the propylene to an intermediate compound such as propylene dichloride, and then to subject this to further chlorination in a separate step, under different conditions to prepare the trichloropropane.

An improved process has now been developed by which 1,2,3-trichloropropane is prepared directly from propylene in a single stage reaction. This process is illustrated by the following example.

Example 1

Propylene and chlorine were passed, at atmospheric pressure in a molal ratio of chlorine to propylene of 1:3, into a glass reaction vessel from which all light was excluded. The feed rate was adjusted to the maximum at which no free chlorine appeared in the gases leaving the reaction vessel, 100% conversion of chlorine being thereby obtained. The reaction vessel was maintained at a temperature of 125 to 150° F. by cooling, in order to remove heat liberated in the process. When the reaction vessel became about half filled with liquid reaction products, these were withdrawn and separated by distillation into the following fractions:

| | Wt. % of product |
|---|---|
| Propylene dichloride | 47.7 |
| 1,2,2-trichloropropane | 14.7 |
| 1,1,2-trichloropropane | 10.5 |
| 1,2,3-trichloropropane | 19.1 |
| Higher-boiling material | 8.0 |
| | 100.0 |

It is thus seen that the trichloropropanes constituted 44.3% of the total product and that the desired 1,2,3-trichloropropane constituted 43% of the trichloropropanes.

It has been found that the presence of iron inhibits the reaction of chlorine with propylene to produce trichloropropane, and that if iron is present, the main product is propylene dichloride. For this reason it is desirable to use reagents and a reaction vessel free of iron, such as the glass reaction vessel used in the above example. The reaction vessel may also be constructed of steel and lined with glass, or it may be constructed of or lined with other materials resistant to the reagents and products of the process, or reacting only slowly under such conditions to form products which do not interfere with the desired reaction. Such materials include ceramic ware and enamels, also rubber, chlorinated rubber, synthetic resins and plastics and carbon. Materials such as aluminum, antimony and their chlorides are also preferably excluded, although catalysts known to promote the chlorination of propylene dichloride to 1,2,3-trichloropropane may be present. Examples of such catalysts are the gaseous sulfur compounds such as sulfur dioxide and the sulfur chlorides.

The presence of light, particularly of the visible and ultra-violet portions of the spectrum, is also objectionable, and all such light is preferably carefully excluded from the reaction zone. The reaction is preferably conducted under such conditions that the desired 1,2,3-trichloropropane is formed as a liquid in contact with the gaseous reagents. The reaction temperature and pressure are accordingly adjusted to permit liquefaction of at least a part of the chlorinated products. The process may be carried out by passing the olefin gas and the chlorine into a reaction vessel partly filled with liquid chlorinated products, with either or both gases being admitted below the level of the liquid. In this case the vessel is preferably also supplied with means for dispersing the gas bubbles in the liquid, such as stirring devices or packing of suitable material such as glass, ceramic or carbon rings or balls. The process may also be conducted by passing the gases through a packed tower containing liquid chlorinated products which may be recycled and pumped through the tower in either parallel or counter-current flow to the gaseous reagents. While the products of the reaction described herein are preferred for forming the liquid phase other hydrocarbon halides such as ethylene dichloride may be used, for example, to provide a liquid phase at the start of the reaction.

The reaction temperature is maintained preferably in the lower portion of the range of 100 to 150° F. While higher temperatures up to about 200° F. may be used, the results obtained are generally less desirable. Due to the exothermic nature of the reaction, it is generally necessary to cool the reaction vessel in order to maintain a suitable reaction temperature.

The reagents while preferably used in fairly pure and concentrated form may also be supplied in more dilute mixtures. For example, the chlorine may contain small amounts of air and carbon dioxide while the propylene may contain other hydrocarbons preferably less than four carbon atoms per molecule, such as methane, ethane, ethylene and the like. Distillate fractions of cracked petroleum gases may be fractionated, as by distillation, to provide fractions containing largely hydrocarbons of three carbon atoms per molecule, known as the propane-propylene cut. Such fractions may also be used, those containing a major proportion of propylene being preferred.

The yield of the desired 1,2,3-trichloropropane may be increased by recycling the lower boiling components of the product, such as the propylene dichloride and the other trichloropropanes. For example, the chlorinated product may be distilled to separate the 1,2,3-trichloropropane from the lower boiling products, and all such products may be recycled, preferably with added chlorine, to the reaction zone. Also the chlorinated product may be distilled to separate the lower boiling propylene dichloride from the less volatile trichloropropanes, the latter then being fractionated to separate 1,2,3-trichloropropane from the other trichloropropanes. The propylene dichloride and/or the other trichloropropanes may then be recycled to the reaction zone together or separately. Somewhat higher concentrations of chlorine to propylene in the feed may also be used, a ratio of about 1:5 being generally preferred, although still higher ratios are preferable when any substantial portion of the chlorinated products is recycled.

This invention is not to be limited to any specific examples or descriptions presented herein, all being intended solely for purpose of illustration, but is limited only by the following claims, in which it is desired to claim all novelty in so far as the prior art permits.

We claim:

1. Process for preparing 1,2,3-trichloropropane, comprising bringing about 1 mol of propylene and about 1 to 2 mols of chlorine into reaction in the gaseous phase and in the dark, in the presence of liquid reaction products and in a reaction vessel free of iron, separating 1,2,3-trichloropropane from the reaction product, and returning lower boiling portions of the product, in the liquid phase, to said reaction vessel.

2. Process for preparing 1,2,3-trichloropropane comprising bringing about 1 mol of propylene and about 1 to 2 mols of chlorine into reaction in the gaseous phase and in the dark, in the presence of liquid reaction products and in a reaction vessel free of iron, separating the trichloropropanes from the reaction products, then separating 1,2,3-trichloropropane from the other trichloropropanes, and returning said other trichloropropanes to said reaction vessel.

3. Process for preparing 1,2,3-trichloropropane comprising bringing, in the absence of light, about one mole of propylene and about one to two moles of chlorine into a reaction vessel free of iron and partly filled with liquid chlorinated products of the reaction, separating the trichloropropanes so formed, fractionating from the said trichloropropanes the 1,2,3-trichloropropane and returning the other trichloropropanes to the said reaction vessel.

4. Process for preparing 1,2,3-trichloropropane comprising bringing, in the absence of light, and at a temperature of between 125° F. and 150° F. about one mole of propylene and about one to two moles of chlorine into a reaction vessel free of iron and partly filled with liquid chlorinated products of the reaction, separating the trichloropropanes so formed, fractionating the 1,2,3-trichloropropane from the said trichloropropanes and returning the other trichloropropanes to the said reaction vessel.

KENNETH C. LAUGHLIN.
CECIL L. BROWN.